Figures 1, 2:
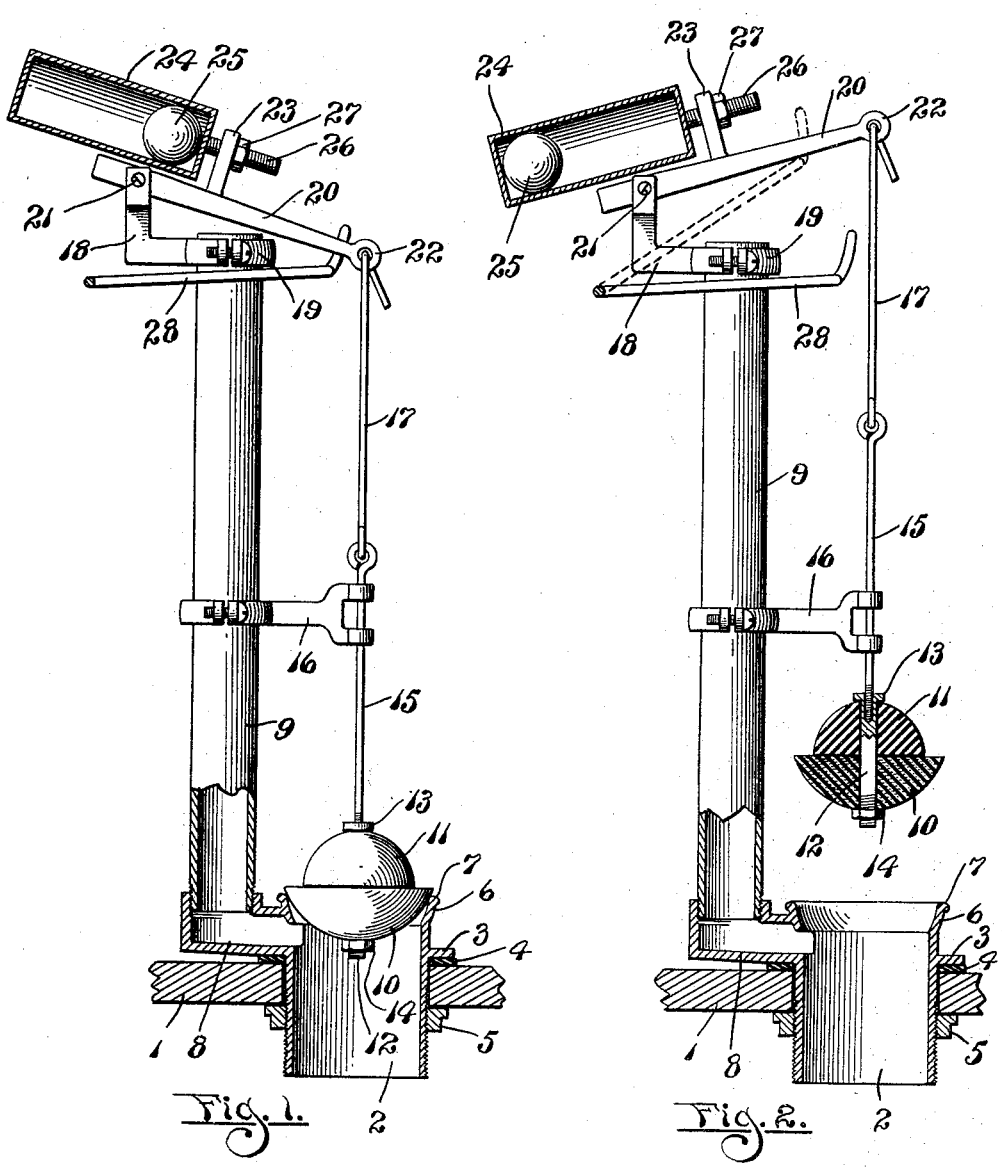

Jan. 3, 1933.  A. R. GILMORE  1,893,202

VALVE FOR FLUSH TANKS

Filed July 7, 1930

Inventor
Allen R. Gilmore
By Liverance and
Van Antwerp
Attorneys

Patented Jan. 3, 1933

1,893,202

UNITED STATES PATENT OFFICE

ALLEN R. GILMORE, OF ST. LOUIS, MISSOURI

VALVE FOR FLUSH TANKS

Application filed July 7, 1930. Serial No. 466,012.

This invention relates to valves for flush tanks, and is primarily concerned with a novel valve made entirely of solid parts so that it does not have such buoyancy of itself as to float on water, associated with which is a means operating automatically when the valve is tripped to lift the same and hold it above the outlet opening which it normally closes, said means automatically operating on lowering the water to closing position. The valve, being made of solid parts, is much more durable than the thin walled rubber flush valves now commonly used which are subject to rapid deterioration and usually need replacement in a relatively short time, said hollow buoyant valves ordinarily being useful anywhere from one to three years. The present valve and the automatic means associated therewith described also may be readily used for replacements in installations now in use, being quickly and easily substituted. Moreover, the construction which I have devised is one of a comparatively simple and economical character so that the expense of manufacturing the same is low.

It is an object and purpose of the present invention to provide a flush valve construction of the type set forth and having the advantages enumerated, as will appear from the following description taken in connection with the accompanying drawing, in which, Fig. 1 is a partial side elevation and vertical section showing the valve in its lower closed position, and Fig. 2 is a similar view showing the valve after it has been tripped and lifted.

Like reference characters refer to like parts in the different figures of the drawing.

The valve is designed to be used to close the outlet of a flushing tank in which a quantity of water is held. The bottom of the tank is indicated fragmentarily at 1, and has an opening made to receive an outlet sleeve 2 extending through the opening to connect with a bowl to which water delivered from the tank is carried. The sleeve is exteriorly threaded at its lower portion and provided with an outwardly extending flange 3 a short distance below its upper ends. Between the flange and the upper side of the bottom 1 of the tank a gasket 4 of rubber or other suitable material is located, and a nut or ring 5 is threaded onto the lower end of the sleeve to bind the parts together making a secure and water tight connection. The upper end portion of the sleeve is curved or flared outwardly to provide a curved seat section 6 terminating in a bead 7, as shown, and the lower part of the valve enters said seat portion and seats against the inner side of the bead. The sleeve 2 at one side and slightly below the upper valve seat described has an integral inlet 8 extending therefrom into which the lower end of a vertical overflow pipe 9 threads. The overflow pipe extends upwardly in the tank and takes care of water in the tank which for any reason reaches a higher level than the upper end of the overflow pipe. This is common and well known conventional construction in flush valve installations and need not be further described.

The float valve of the present invention comprises two members bound together. The lower member 10 is of relatively soft rubber and is a segment of a sphere, the curved side being below while the upper side of the part 10 is flat and in a horizontal plane. The other member of the valve is a semi-sphere 11 of a harder rubber and of a shorter radius than the radius of the sphere of which the part 10 is a segment.

A rod 12 formed with a flange 13 at its upper end extends through the two parts 10 and 11 being threaded at its lower end to receive a binding nut 14. Tightening the nut draws the flange 13 snugly against the upper member 11 of the valve and secures the parts together. Should the lower softer section 10 become worn so as to need replacement it is very readily done by removing the nut 14.

The upper end of the binding rod 12 is interiorly bored and threaded whereby the lower end of the lower rod 15 of the lifting mechanism is screwed into place. Rod 15 extends upwardly, being guided in the bracket arm 16 mounted on and extending from the overflow pipe 9, has an eye at its upper end to join with another eye at the lower end of an upper rod 17 located in vertical alignment with the rod 15, and adapted to be connected at its upper end with the counterbalance mechanism which automatically serves as a substitute for the normal buoyancy of the ordinary hollow valve when the valve of my invention is tripped.

Said counterbalance construction comprises a bracket 18 of L-shape the horizontal portion of which is clamped to the upper end of the overflow pipe 9 by a clamp 19. A lever 20 is pivotally mounted near one end at 21 to the upper end of the vertical arm of the bracket 18. The opposite end of the lever 20 has an eye 22 through which the upper end portion of rod 17 may be passed and bent downwardly as shown. A lug 23 extends upwardly at right angles to the lever 20 between its ends. An elongated metal casing 24 preferably, though not necessarily, of cylindrical form and closed at both ends has a ball 25 mounted therein for free movement. A threaded rod 26 extends from one end of the casing 24, threads through the lug 23 and has a lock nut 27 thereon as shown.

The usual trip lever 28 for operating the mechanism, which extends to the front of the tank has a free end portion extending under the lever 20. Because the solid flush valve construction described is heavier than water it will not normally float. With the valve in closed position, as shown in Fig. 1, there is the pressure of water in the flush tank above the valve, while the weight of the ball 24 being to one side of the pivot 21 helps to hold the valve in closed position. On operating the trip 28, as from the full line position in Fig. 2 to the dotted line position, the lever 20 is raised tipping the casing 24 so that the ball 25 runs down the same to the other side of the pivot 21 and the action of its weight plus the normal buoyant effect of water on any body submerged in it is sufficient to lift the valve and maintain it in lifted position, as shown in Fig. 2. The weight of the valve however as the water lowers and the valve comes above the level of the water overcomes the counterbalance of the ball 25 and the valve follows downwardly after the water level is lowered to somewhat below the upper portion of the valve until the ball 25 rides over the pivot 21, whereupon the weight of the valve plus the effect of the weight of the ball serves to move the valve rapidly downwardly to seated position against the seat portion 6 of the sleeve 2. This occurs when there is approximately an inch depth of water over the valve seat 6.

It is evident that the counterbalance construction comprising the casing 24 and the weight 25 may be adjusted with respect to the lug 23 on lever 20 so as to give the best performance and, when once adjusted to such position, may be locked therein by tightening the lock nut 27 against the lug, 23. In practice the volume of water displaced by the valve body is substantially four ounces. When the trip at 28 is operated the effect of the counterbalance is the same as though the valve had become three ounces lighter than the volume of water it displaces whereupon it will be elevated or float. As the water recedes or is lowered in the tank, the valve will remain stationary until the water reaches a point at which the valve displaces but one ounce of water, after it becomes heavier than the counterbalance effect and follows and floats lightly on the water until the ball 24 moves to the opposite end of the casing thereby removing its lifting effect on the valve and causing the valve to close very quickly and very tightly.

It will be noted that the pivotal connection of the eyes at the adjacent ends of the rods 15 and 17 is such as to permit the rod 15 to move vertically while the rod 17 may have a swinging movement necessitated by the arcuate path of movement of the eye 22 when the lever 20 is moved from the position shown in Fig. 1 to that shown in Fig. 2, or vice versa.

It is evident also that the entire construction including the valve, the rods 15 and 17, the counterbalance and its mountings may be very quickly and easily substituted as a replacement for the float valve construction now commonly used in flush valves. The bracket arm 18 is quickly and easily clamped to the upper end of the overflow pipe 9. The guide arm 16 common to practically all flush valve installations may have the rod 15 passed therethrough and the solid valve of my invention screwed on to the lower end of the rod 15. The lower part 10 of the valve of soft rubber insures a very snug and water tight seat, and as said before can be replaced if necessary.

The construction is of an economical design but is chiefly valuable by reason of its long life and much greater durability than the ordinary hollow thin walled rubber float valve now commonly used. The invention is defined in the appended claim and is to be considered comprehensive of all forms of structure coming within its scope.

I claim:

In a flush tank having a vertical overflow pipe therein and an outlet adjacent thereto, the combination of a bracket, clamping means for slidably fastening said bracket to the overflow pipe whereby it may be vertically adjustable, a lever arm pivotally mounted to the bracket, said lever arm having a projection extending upwardly therefrom, valve means adapted to seat in said outlet opening, means for guiding said valve means, additional means for fastening the last mentioned guiding means to the vertical overflow pipe whereby it may be vertically adjusted therealong, said valve means having a weight greater than an equal volume of water, means connecting the valve to the end of the said lever arm whereby it may be raised and lowered from and to its seat, said connecting means permitting a limited universal movement between the valve and its supporting lever arm, a member having a track therein, means movably mounted on said track, and means to fasten the said member to the projection for the purpose described.

In testimony whereof I affix my signature.

ALLEN R. GILMORE.